United States Patent
Weis et al.

(10) Patent No.: US 12,449,342 B2
(45) Date of Patent: Oct. 21, 2025

(54) METHOD AND DEVICE FOR ANALYSING PARTICLES OF AN AEROSOL

(71) Applicant: Palas GmbH Partikel-und Lasermesstechnik, Karlsruhe (DE)

(72) Inventors: Frederik Weis, Herxheim (DE); Maximilian Weiss, Weingarten (DE)

(73) Assignee: Palas GmbH Partikel-UND Lasermesstechnik, Karlsruhe (DE)

( * ) Notice: Subject to any disclaimer, the term of this patent is extended or adjusted under 35 U.S.C. 154(b) by 277 days.

(21) Appl. No.: 17/957,880

(22) Filed: Sep. 30, 2022

(65) Prior Publication Data

US 2023/0014672 A1 Jan. 19, 2023

Related U.S. Application Data

(63) Continuation of application No. PCT/EP2021/057544, filed on Mar. 24, 2021.

(30) Foreign Application Priority Data

Apr. 1, 2020 (DE) ..................... 10 2020 002 041.0

(51) Int. Cl.
*G01N 15/02* (2024.01)
*G01N 1/22* (2006.01)
(Continued)

(52) U.S. Cl.
CPC ....... *G01N 15/0255* (2013.01); *G01N 1/2211* (2013.01); *G01N 1/4077* (2013.01); *G01N 15/0205* (2013.01)

(58) Field of Classification Search
CPC ............. G01N 15/0255; G01N 1/2211; G01N 1/4077; G01N 15/0205
(Continued)

(56) References Cited

U.S. PATENT DOCUMENTS

| 9,581,494 B2 | 2/2017 | Weiss et al. |
| 2014/0122021 A1 | 5/2014 | Li et al. |

FOREIGN PATENT DOCUMENTS

| DE | 3641716 A1 | 6/1988 |
| DE | 4413525 A1 | 10/1995 |

(Continued)

OTHER PUBLICATIONS

International Search Report dated Jun. 11, 2021 in corresponding application PCT/EP2021/057544.

*Primary Examiner* — Md M Rahman
(74) *Attorney, Agent, or Firm* — Muncy, Geissler, Olds & Lowe, P.C.

(57) ABSTRACT

In order to achieve improved determination of fine dust particles, a method is provided for determining particles of an aerosol whereby, in a first measuring step, aerosol is fed to an optical aerosol measuring device without being influenced by a controllable centrifugal separator, at least in a further measuring step aerosol is guided to the optical measuring device while being influenced by the centrifugal separator rotating at least at a speed deviating from the speed 0, and properties of the particles of the aerosol are determined from the received measurement signals of the optical measuring device in the first and in at least one further measuring step. A device is also provided, which has an optical sensor unit forming the measuring volume for recording particles, and is designed such that a separator for size- and/or mass-sensitive separation of particles is arranged upstream of the sensor unit.

11 Claims, 5 Drawing Sheets

(51) Int. Cl.
*G01N 1/40* (2006.01)
*G01N 15/0205* (2024.01)

(58) Field of Classification Search
USPC .......................................................... 356/338
See application file for complete search history.

(56) References Cited

FOREIGN PATENT DOCUMENTS

| | | |
|---|---|---|
| DE | 102009000904 A1 | 9/2009 |
| EP | 2717035 B1 | 12/2016 |
| WO | WO 9941588 A1 | 8/1999 |

METHOD AND DEVICE FOR ANALYSING PARTICLES OF AN AEROSOL

This nonprovisional application is a continuation of International Application No. PCT/EP2021/057544, which was filed on Mar. 24, 2021, and which claims priority to German Patent Application No. 10 2020 002 041.0, which was filed in Germany on Apr. 1, 2020, and which are both herein incorporated by reference.

BACKGROUND OF THE INVENTION

Field of the Invention

The present invention relates to a method for determining particles of an aerosol and to a device for determining particles of an aerosol flowing through a measuring volume, which device has an optical sensor unit forming the measuring volume for detecting particles.

Description of the Background Art

Firstly, there are simple optical measuring devices for measuring fine dust which record the fine dust in the air in a lump sum in a channel, as it were, and display the measured value in the form of a voltage value on a display.

In addition, there are elaborately designed and operating aerosol spectrometers in which individual particles are counted on the basis of a signal generated by light scattering on them and are recorded with respect to the strength of the scattering signal in a multiplicity of individual channels, up to 256 channels. The strength of the scattered light signal is used as a measure of the size of the particle such that the particles can in principle be recorded and evaluated with regard to their size.

However, only the optical size or the optical diameter of the particles of the aerosol can be recorded with such an aerosol spectrometer based on the received light signal. However, this can be the same for particles having a different refractive index, form factor (round/angular), density, in other words: particles of different sizes can actually cause the same scattered light signal or, depending on the influencing factors mentioned, particles of the same aerodynamic size (diameter) can cause different scattered light signals.

SUMMARY OF THE INVENTION

It is therefore an object of the present invention to provide a method and a device in such a way that they allow improved determination of the fine dust fractions in the case of optical measurement.

According to an exemplary embodiment of the invention, the aforementioned object is achieved by a method which is characterized in that, in a first measuring step, aerosol is fed to an optical aerosol measuring device without being influenced by a controllable separator, in at least one further measuring step aerosol is guided to the optical measuring device while being influenced by the separator rotating at a speed deviating from the speed 0, and properties of the particles of the aerosol are determined from the received measurement signals of the optical measuring device in the first and the at least one further measuring step.

To achieve the aforementioned object, the invention also provides a generic device that is characterized in that a separator for size- and/or mass-sensitive separation of particles is arranged upstream of the sensor unit.

By means of the method according to the invention, the device according to the invention makes it possible to determine the separation efficiencies of particles of an aerosol when the separation fan is stationary and as a function of the speed of the separation fan, this being done optionally with respect to the individual particle fractions according to the sizes of the particles in a spectrometer having a plurality of channels. Calibration can be carried out in advance using standard aerosols of predefined particles.

The method and the device according to the invention result in improved determination of the fine dust particles, in particular the fine dust fractions, i.e., the smaller particles in an aerosol also having larger particles, which, when the fan is switched on, are to a greater or lesser extent, sometimes completely, separated as a function of the conveying capacity of said fan. The previous problems mentioned at the outset are thus overcome. In the case of spectrometric measurement of the optical particle diameters, the aerodynamic diameters of the particles of the fractions can be inferred by determining the particle numbers of the individual fractions at different separating forces of the separator.

The separator can be arranged in a secondary branch to a main inlet to the sensor unit.

It is provided that the separator can act as a centrifugal separator and separates light and heavy particles by means of centrifugal force.

Alternatively or additionally, it can be provided that, through an annular channel, an inlet to the fan is located at the lower end thereof and an inlet of a feed tube to the sensor unit is located at the upper end thereof, wherein the annular channel in particular has a helical overlying deflector plate over its inlet, which deflector plate is helical over a maximum of one turn.

The particles are fed to an aerosol spectrometer, preferably having a number of channels of up to 256.

Aerodynamic diameters of the particles of the aerosol can be determined in particular as a function of the speed of the centrifugal separator and thus of the electrical voltage applied to it $d=f(d_o,D)$ or $d=f(d_o,U)$, where d is the aerodynamic particle diameter, $d_o$ is a measured optical particle diameter, D is the speed of the centrifugal separator and U is the electrical voltage applied to it.

Particles of the aerosol can be selected according to size by means of the centrifugal force of the fan and/or that particles of the aerosol are selected according to size by means of the centrifugal force of the fan in an ascending annular flow of the aerosol.

In addition, a development of the method according to the invention provides that the fractional efficiency $FAG_i=c_n(d_p),L_i/c_n(d_p),L_0$ of individual size fractions of the particles of the aerosol is determined, where $c_n(d_p),L_i$ is the concentration of fraction n=1 ... N, N=1 ... 256 in measuring step i with the centrifugal separator switched on at a specified speed and $c_n(d_p),L_0$ is the concentration of fraction n in the first step 0 with the centrifugal separator switched off and thus at rest.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
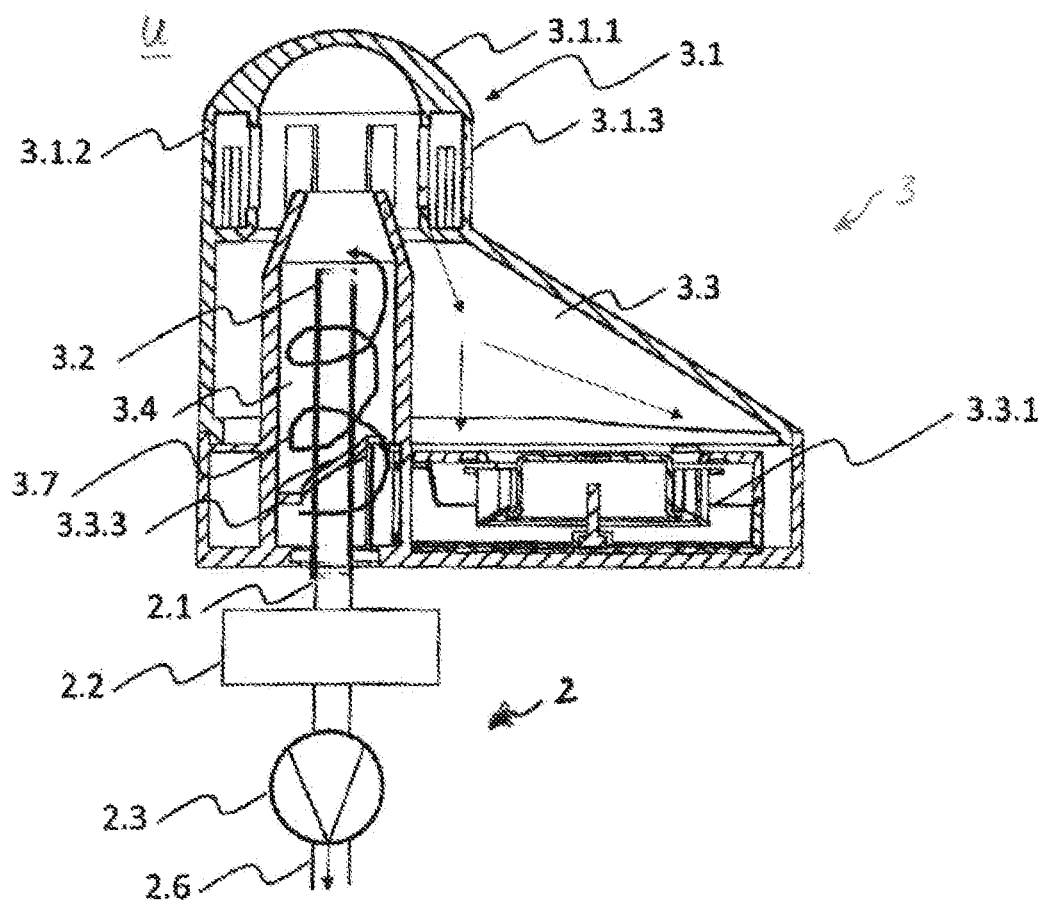
FIG. 1 is a schematic sectional view of a first embodiment of the device according to the invention.

A device 1 according to the invention in FIG. 1 has a sensor unit 2 having a particle measuring device and a separator 3 arranged upstream thereof.

The separator 3 has an inlet in the form of an inlet head 3.1 that has an annular double wall 3.1.2 under a closed hood 3.11, through which (unknown) aerosols from the surroundings U can flow into the device, which encloses an inlet 3.2.1 of a feed tube leading to the flow tube 2.1. The inner ring and outer ring of the double wall 3.1.2 each have openings 3.1.3 that are offset in the circumferential direction, as a result of which the inflowing particle flow is evened out.

An outer tube 3.1.4 is arranged below the inlet head 3.1, in which outer tube a feed tube 3.2 to the flow tube 2.1 of the sensor unit 2 is arranged. An annular channel 3.4 is formed between the tube 3.1.4 and flow tube 2.1.

A feed chamber 3.3, also having an inlet from the inlet head 3.1, is arranged to the side of the tube 3.1.4, and in the lower region thereof there is a fan 3.3.1, in this case having a horizontal axis of rotation. The annular channel 3.4 forms a return channel and separating channel from the fan 3.3.1 to the inlet of the feed tube 3.2. Directly below the inlet of the annular channel 3.4 from the fan 3.3.1 an annular channel a helical overlying deflector plate is arranged, from which the feed tube 3.2 extends by at most one turn.

The sensor unit 2 can be designed in the usual way, for example according to DE 3641716 A1 (FIG. 3) or EP 2 717 035 B1.

The sensor unit 2 substantially has a flow tube 2.1 having a particle measuring device 2.2 that is followed by a gas conveyor 2.3 for sucking an aerosol containing particles through the flow tube 2.1 and the particle measuring device 2.2. A gas conveyor is a conveying device for conveying a medium whose carrier fluid is gas. Such a medium also includes aerosols. Specifically, the gas conveyor can be designed as a fan or pump.

The particle measuring device 2.2 (FIG. 2) has, in a known manner, an illumination unit 2.2.1 with which the particles flowing through the flow tube 2.1 are illuminated in a (virtual) measuring cell 2.2.2 formed by the light beam of the illumination unit in the flow tube 2.1. In addition, the particle measuring device 2.2 has a sensor or detector 2.2.3 by means of which scattered light scattered by the particles of the aerosol flowing through the flow tube 2.1 is recorded and, in particular when the measuring device is designed as a particle counter or spectrometer, light signals of the recorded particles are counted or are recorded spectroscopically in individual channels corresponding to the particle sizes. A converging lens can be arranged downstream of the light source in order to generate a parallel beam, and a converging lens is arranged upstream of the deflector 2.2.3 in order to focus the scattered light on the deflector 2.2.3. The detector is assigned a counting or evaluation unit 2.2.4, by means of which the particles detected by the detector are counted size-selectively in up to 256 channels, for example, according to their (optical) size given by the intensity of the light scattered by them, and thus a size distribution of the particles can be measured and output (FIG. 3).

During the measurement, the light intensity of the scattered light and thus also the resulting electrical signal strength is a measure of the particle size of the aerosol particles, to which a particle diameter is assigned accordingly. The measured particle size distribution is a function of the particle diameter.

If the fan 3.3.1 is switched off and therefore at rest, the entire aerosol with all its particle size fractions is, exclusively by means of the gas conveyor 2.3 in the form of a suction pump of the sensor unit 2, sucked via the inlet 3.2.1 through the feed tube 3.2, the flow tube 2.1, the measuring unit 2.2, and the gas conveyor 2.3 to an outlet 2.6 of the sensor unit 2 and thus through the (virtual) measuring cell in the measuring unit 2.2. In this way, all scattering particle fractions of the aerosol flow through the measuring cell and are recorded by the evaluation unit.

If the separator 3 is switched on by switching on the fan 3.3.1, aerosol is sucked in by the latter through the feed chamber 3.3 and pushed through the return channel. The particles are initially subjected to centrifugal or radial forces and thus radial accelerations by the fan 3.3.1, which are greater for larger particles than for smaller particles. This has the effect that larger particles are separated, and only smaller particles enter the lower part of the annular channel 3.4 and are sucked by the gas conveyor 2.3 through the (upper) inlet of the feed tube 3.2, the flow tube 2.1 and thus the measuring unit 2.2 and thus contribute to signal formation in the measuring cell.

The sucked-in aerosol flow is guided tangentially by the fan 3.3.1 by means of a deflector plate 3.3.3 into the annular gap 3.4 forming a separating channel between the feed tube 3.2 and the wall surrounding it, and a swirl flow is generated. At the upper end, suction takes place to the particle counter/aerosol spectrometer. The aerosol fed from the annular channel 3.2 to the fan 3.3.1 and the (residual) aerosol sucked in by the gas conveyor 2.3 are put into a helical upward flow, which is supported by the aforementioned deflector plate. As a result, further coarse particle fractions can be deposited and only the smallest particles rise, enter the feed tube 3.2 through the upper inlet thereof and finally pass through the sensor unit 2, and only such small particles are recorded and evaluated by the evaluation unit.

Aerosol entering the feed tube from above when the fan 3.3.1 is switched on is sucked a deflector plate 3.3.3 in the lower region of the feed tube 3.2 by the fan 3.3.1 back to the inlet to the feed chamber 3.3 via the annular channel 3.4. This ensures that when the fan is switched on, practically the entire aerosol is guided therethrough and is subject to the separating effect thereof such that large and coarse particles are deposited and small particle fractions in the aerosol are conveyed further. In this way, the separation can take place both directly by means of the fan and in the annular channel. The particular fraction depends on the particular aerosol and the speed. However, the main separation takes place directly in the fan. The separating channel forms an additional element that further improves the separation efficiency. The annular channel thus acts as a gravity separator.

The aerosol flow emerging from the separator 3 via the flow tube 2.1 is sucked by the pump 2.3 through the measuring cell 2.2.2 of the measuring unit 2.2 and illuminated there by the illumination unit 2.2.1. Light scattered by individual particles of the aerosol hits the sensor or detector 2.2.3 via the converging lens. The corresponding optoelectronically converted detected signal is then evaluated in the evaluation unit 2.2.4, in particular analyzed spectrometrically by a spectrometer with regard to particle size, for which for example 256 (size) channels can be available.

FIG. 3 shows another embodiment of the device according to the invention in which the structure of the sensor unit 2 is in principle the same as in the embodiment of FIG. 1.

Figure 5:
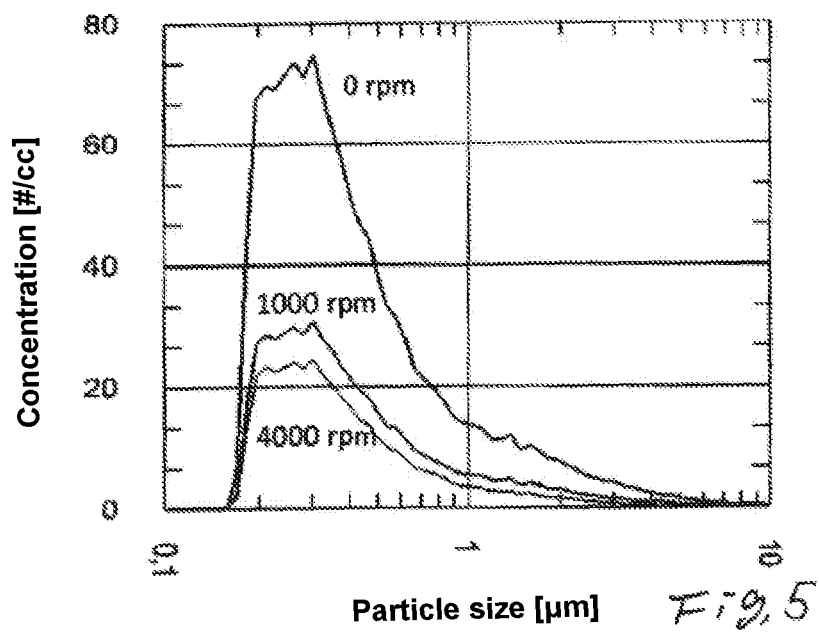
FIG. 5 is a representation of the fractional efficiency of a device according to the invention as a function of the speed.

While the fan is aligned with a vertical axis in the embodiment of FIG. 1, the fan 3.3.1 in the embodiment of FIGS. 3 and 5 has a horizontal axis.

Figure 2:
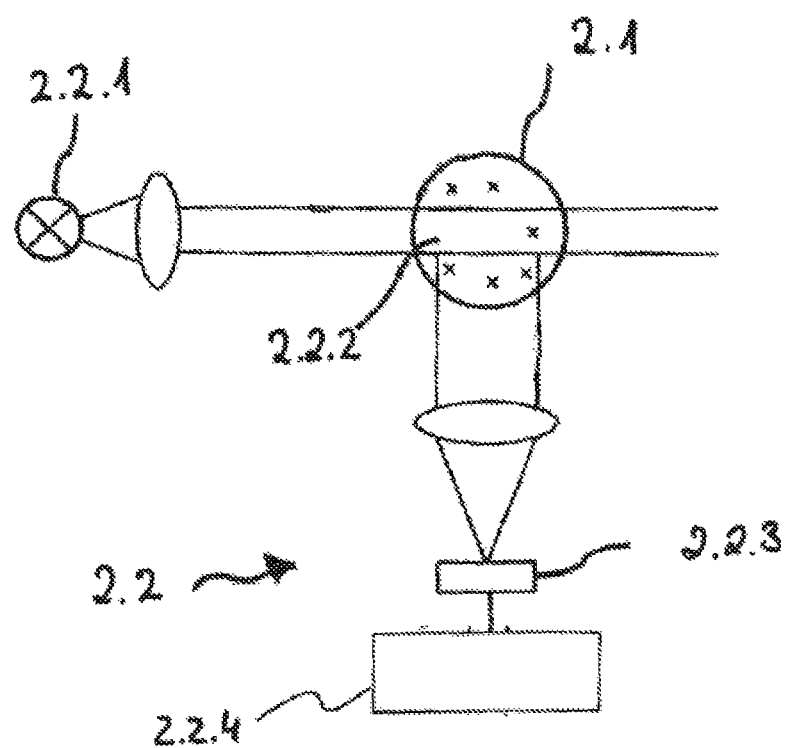
FIG. 2 is a detailed representation of the measuring unit of FIG. 1.
Figure 3:
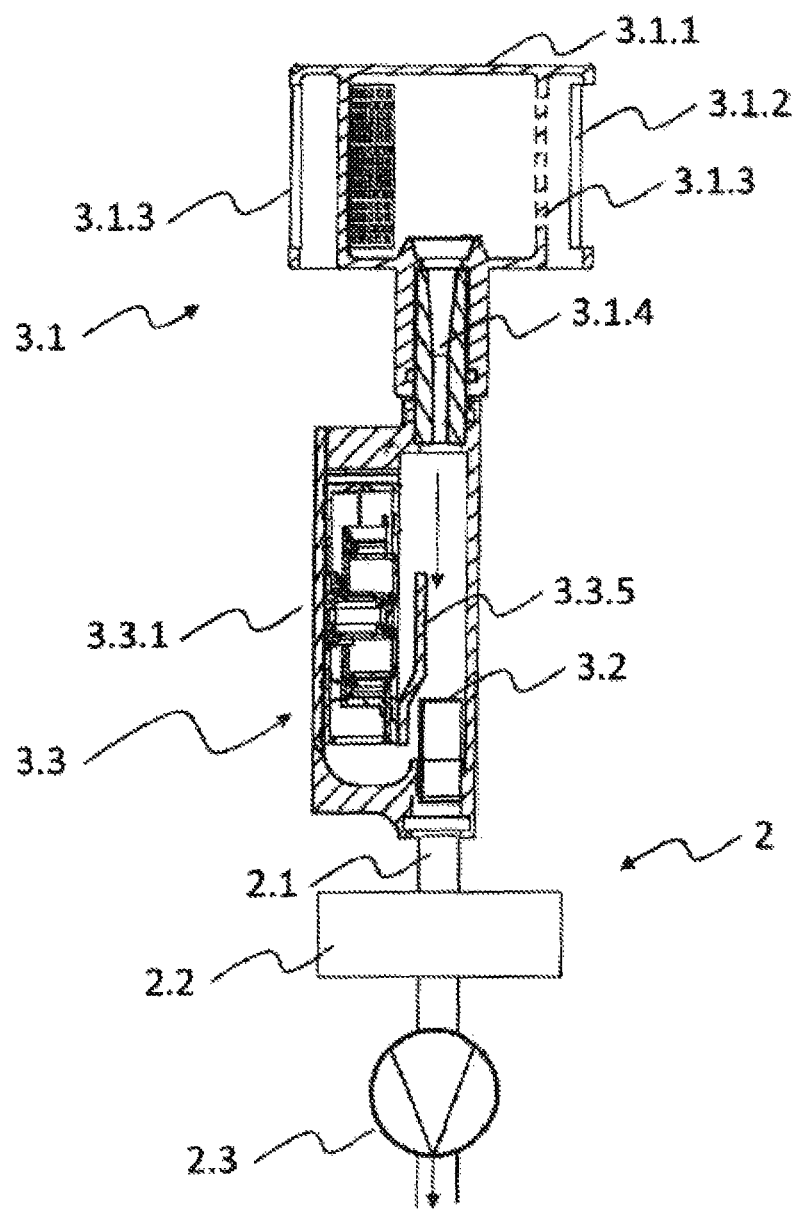
FIG. 3 shows a further embodiment of the device according to the invention.

In the embodiment of FIG. 3, the sensor unit 2 can be the same as in FIGS. 1 and 2 and as described with regard to these figures.

Otherwise, the embodiment of the device 1 according to FIG. 2 is in principle the same as in FIG. 1, which is why identical parts are provided with identical reference signs and reference is made to the representation of FIG. 1 for existing identical features.

A nozzle tube 3.1.4 is interposed between the inlet head 3.1 and the feed tube 3.2 in order to shape the aerosol flow as laminarly as possible. The feed chamber 3.3 having the fan 3.3.1 is in this case arranged parallel to the feed tube, wherein a deflector plate 3.3.3 that is effective when the fan 3.3.1 is in operation is provided in said feed tube.

The operating principle is again the same in principle: If the fan 3.3.1 is switched off and at rest, the aerosol is only sucked through the gas conveyor 2.3 via the inlet head 3.1 into and through the feed tube 3.2, through the flow tube 2.1 and the measuring unit 2.2 and released via the gas conveyor 2.3. The entire aerosol with all the particles contained therein, in particular particle fractions, passes through the measuring cell such that all particles of the aerosols located in the surroundings and entering the flow tube 2.1 scatter the light source and can therefore be recorded by the detector.

If, on the other hand, the fan is switched on and rotates at high speed, the flow takes place via the secondary branch. The aerosol is swirled by the fan 3.3.1, larger particles reach a greater radial speed and are separated, in the embodiment of FIG. 2 in the center below the fan, while only smaller particles are sucked into the inlet head 3.1 by the gas conveyor 2.3 and pass through the measuring cell.

Figure 4:
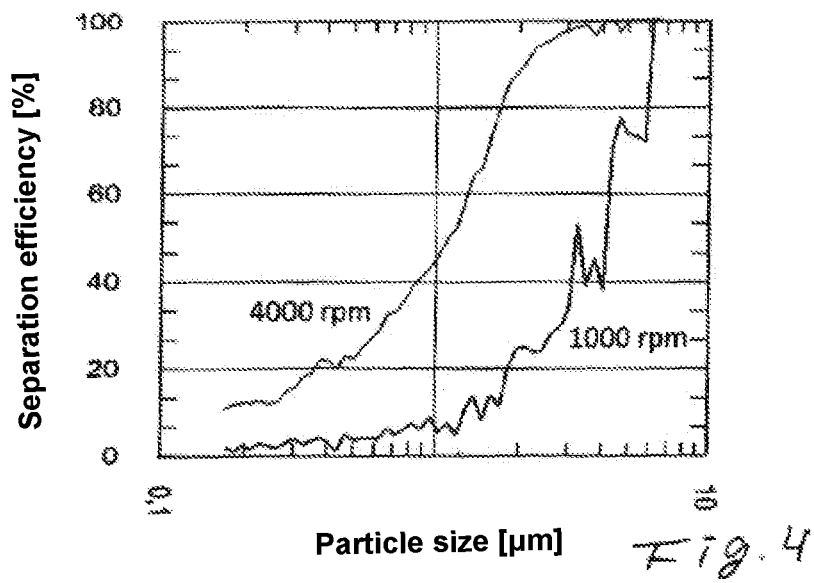
FIG. 4 is a representation of the size distribution of the particles measured in the particle counter of the device according to the invention as a function of their diameter when the separator is stationary.

The above can be seen from FIGS. 3 to 5:

FIG. 3 shows the particle distribution $c_n$ measured in a device 1 according to FIGS. 1 and 2, i.e., the particle concentration as a function of the particle size d, specifically in the case of the upper curve with the separating fan switched off or at rest. In this case, it can be seen that a significant signal occurs even in the case of larger particles.

If, on the other hand, the fan is switched on, there is a greater drop in the particle size distribution with a larger particle diameter according to the middle curve at a rotational speed of the fan of 1000 rpm, showing that the concentration of larger particles is significantly reduced. Increasing the rotational speed of the fan to 4000 rpm further reduces the concentration of the larger particles in the lower curve shown.

FIG. 5 shows the separation efficiency or the fractional efficiency $FAG_i = c_n(d_p), L_i$ as a function of the upper particle size.

Figure 6:
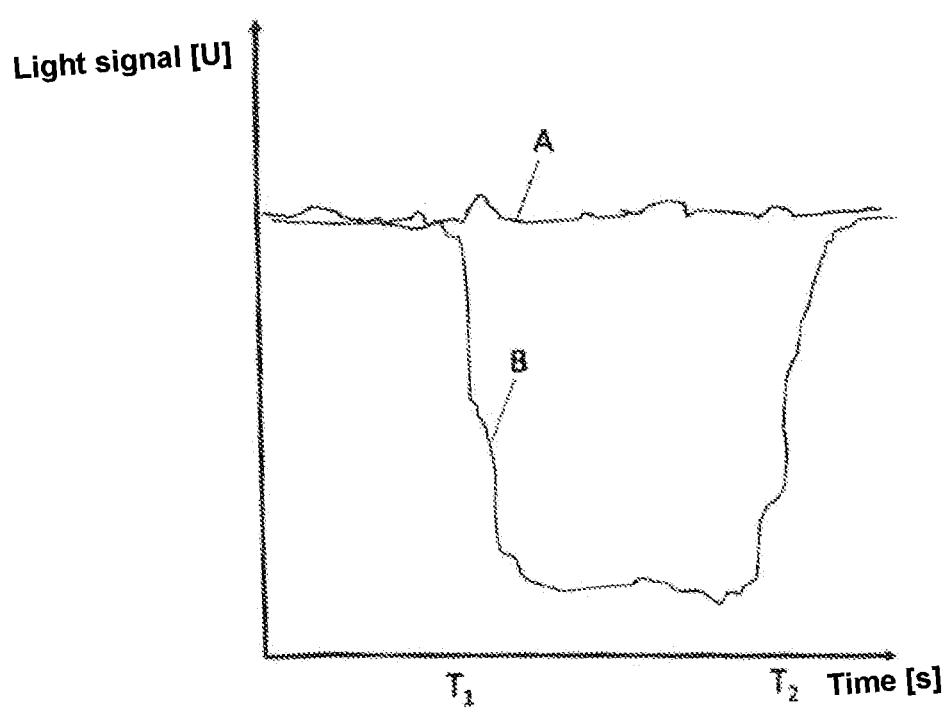
FIG. 6 is a representation of the signal curve of the particle counter for small particles or large particles over time with the separator being switched on and off.

FIG. 6 in turn shows a sensor light signal of scattered light scattered on particles as a function of time with a curve A for small particles and a curve B for large particles. The fan is switched off until time T1, switched on at T1 and switched off again at T2.

It can be seen that when the fan is switched on, the measurement signal B is significantly reduced in the case of coarse particles.

The measurement results with the fan switched off and on or with the fan at rest (speed 0) and with the fan rotating at different speeds require additional information compared to purely optical measurement of a particle counter without any influence on the aerosol or separation behavior for particles of different sizes, i.e., compared to previous purely optical measurement, due to the aerodynamic separation behavior of the particles in the aerosol, in particular due to the size of the particles, mass and/or form factor. While the relationships are presented qualitatively above, the behavior of the particles as a function of the fan speed is determined empirically using fine calibration dust having a specified size and using other properties such that improved calculation of the fine dust fractions of an aerosol is given due to such a calibration of the influence of the fan speed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining particles of an aerosol, the method comprising:
   feeding aerosol to an optical aerosol measuring device without being influenced by a controllable separator;
   guiding the aerosol to the optical measuring device while being influenced by the controllable separator rotating at a speed deviating from the speed 0; and
   determining properties of the particles of the aerosol from the received measurement signals of the optical measuring device in the feeding and guiding steps.

2. The method according to claim 1, wherein the particles are fed to an aerosol spectrometer as an optical measuring device having a number of channels of up to 256.

3. The method according to claim 2, wherein aerodynamic diameters of the particles of the aerosol are determined as a function of the speed of the centrifugal separator and thus of the electrical voltage applied to it $d = f(d_o, D)$ or $d = f(d_o, U)$, where d is the aerodynamic particle diameter, $d_o$ is a measured optical particle diameter, D is the speed of a fan of the separator and U is the electrical voltage applied to it.

4. The method according to claim 1, wherein a fractional efficiency $FAG_i = c_n(d_p), L_i / c_n(d_p), L_0$ of individual size fractions of the particles of the aerosol is determined, where $c_n(d_p), L_i$ is the concentration of fraction n=1 ... N, N=1 ... 256 in measuring step i with the separator switched on at a specified speed and $c_n(d_p), L_0$ is the concentration of fraction n in the first step 0 with the separator switched off and thus at rest.

5. The method according to claim 1, wherein particles of the aerosol are selected according to size via a centrifugal force of the fan.

6. The method according to claim 1, wherein particles of the aerosol are selected according to size via a centrifugal force of the fan in an ascending annular flow of the aerosol.

7. The method according to claim 1, wherein large particles are deposited in the case of air flow caused by the fan.

8. The method according to claim 1, wherein small particles (fine dust fractions) are supplied to the sensor unit, in particular the fine dust fraction PM2.5.

9. The method according to claim 1, wherein unknown aerosol is sucked in from the surroundings.

10. The method according to claim 1, wherein a particle size distribution is determined optoelectronically.

11. The method according to claim 1, wherein the aerosol is illuminated with light, scattered light signals scattered by aerosol particles are detected and processed, preferably spectrometrically, and in particular a size distribution of the particles (particle size distribution) is created.

* * * * *